US011372258B2

(12) United States Patent
Lim et al.

(10) Patent No.: US 11,372,258 B2
(45) Date of Patent: Jun. 28, 2022

(54) LENS PIECE, LENS ASSEMBLY AND IMAGING DEVICE INCLUDING THE SAME

(71) Applicant: PixArt Imaging Inc., Hsin-Chu County (TW)

(72) Inventors: Wan-Piang Lim, Penang (MY); Sai-Mun Lee, Penang (MY)

(73) Assignee: PIXART IMAGING INC., Hsin-Chu County (TW)

( * ) Notice: Subject to any disclaimer, the term of this patent is extended or adjusted under 35 U.S.C. 154(b) by 224 days.

(21) Appl. No.: 16/790,284

(22) Filed: Feb. 13, 2020

(65) Prior Publication Data

US 2021/0255473 A1 Aug. 19, 2021

(51) Int. Cl.
*G02B 27/62* (2006.01)
*G02B 7/02* (2021.01)

(52) U.S. Cl.
CPC ............. *G02B 27/62* (2013.01); *G02B 7/025* (2013.01)

(58) Field of Classification Search
CPC ................ G02B 27/62; G02B 7/025; G02B 2003/0093; G02B 3/02
See application file for complete search history.

(56) References Cited

U.S. PATENT DOCUMENTS

| 6,055,111 | A | * | 4/2000 | Nomura | B29D 11/00413 359/642 |
|---|---|---|---|---|---|
| 8,008,119 | B2 | * | 8/2011 | Low | H01L 31/02325 438/106 |
| 2016/0265739 | A1 | * | 9/2016 | Lee | F21V 5/10 |
| 2017/0322395 | A1 | * | 11/2017 | Lin | G02B 13/0055 |

* cited by examiner

*Primary Examiner* — Robert E. Tallman
(74) *Attorney, Agent, or Firm* — Hauptman Ham, LLP (57) ABSTRACT

There is provided a lens piece and a lens assembly as well as an imaging device including the same. The lens assembly includes the lens piece and a lens barrel. The lens piece has a wing extending transversely from a lens sidewall. The lens barrel carries the lens piece, and includes a reservoir corresponding to the wing of the lens piece for containing adhesive.

19 Claims, 6 Drawing Sheets

LENS PIECE, LENS ASSEMBLY AND IMAGING DEVICE INCLUDING THE SAME

BACKGROUND

1. Field of the Disclosure

This disclosure generally relates to a lens structure and, more particularly, to a miniature lens easier to be gripped by a clamping apparatus, and a lens assembly as well as an imaging device including the same.

2. Description of the Related Art

The miniature lens is generally manufactured separately from an image sensor. In the assembly process, the miniature lens is arranged upon the image sensor using a clamping apparatus to form a sensing device.

However, in the process of fabricating a miniature sensing device, if the miniature lens has a cylindrical shape, it is difficult to grip the miniature cylindrical lens by the clamping apparatus due to a small size and a cylindrical appearance of the lens. Meanwhile, in the process of gripping the miniature cylindrical lens by the clamping apparatus, it is possible to scratch an active area of the miniature cylindrical lens. In addition, in fixing the miniature cylindrical lens to a lens barrel by using adhesive, the adhesive can spread to the active area of the miniature cylindrical lens to degrade the optical performance thereof.

Accordingly, the present disclosure provides a lens structure that has a wing transversely protruding from a lens sidewall of a miniature cylindrical lens for being gripped by a clamping apparatus. In addition to help the clamping apparatus to arrange the miniature cylindrical lens in a lens barrel, the wing can also be used to be adhered to the lens barrel by using adhesive and/or by mechanical means via a feature pressing down onto the wing, such that the scratching and the contamination of the active area of the miniature cylindrical lens are effectively avoided.

SUMMARY

The present disclosure provides a cylindrical lens that has a wing extending from a sidewall thereof to facilitate the gripping and pressing on the wing by a clamping apparatus such that an active area of lens is not contacted in handling or moving the cylindrical lens.

The present disclosure further provides a lens assembly in which a reservoir of a lens barrel thereof is arranged to be opposite to a wing of a cylindrical lens thereof. The reservoir contains adhesive injected through the wing to adhere the cylindrical lens to the lens barrel. The reservoir is further functioned as a positioning point for arranging the cylindrical lens thereby improving the assembly accuracy.

The present disclosure provides a lens piece including a lens body and a wing. The lens body has a cylindrical shape and includes a lens sidewall parallel to an optical axis of the lens piece. The wing transversely protrudes from the lens sidewall of the lens body.

The present disclosure further provides a lens assembly including a lens piece and a lens barrel. The lens piece includes a lens body and a wing. The lens body has a cylindrical shape and includes a lens sidewall parallel to an optical axis of the lens piece. The wing transversely protrudes from the lens sidewall of the lens body. The lens barrel carries the lens piece and includes a reservoir corresponding to the wing of the lens piece for containing adhesive.

The present disclosure further provides an imaging device including a substrate, a sensor, a lens piece and a lens barrel. The sensor is arranged on the substrate. The lens piece includes a lens body and a wing. The lens body has a cylindrical shape and includes a lens sidewall parallel to an optical axis of the lens piece. The wing transversely protrudes from the lens sidewall of the lens body. The lens barrel is arranged on the substrate to carry the lens piece, and includes a reservoir and an accommodation space. The reservoir corresponds to the wing of the lens piece for containing adhesive. The accommodation space is for accommodating the sensor therein.

In the embodiment of the present disclosure, a diameter of the cylindrical lens is between, for example, 1 and 3 millimeters. The cylindrical lens and at least one wing thereof are integrally formed by molding process to have same material, e.g., transparent plastic material and/or glass material. Corresponding to the shape of the clamping or handling apparatus, the wing is arranged to protrude from a sidewall of the cylindrical lens vertically or with a tilt angle, and a surface of the wing is arranged as a plane surface or a curved surface. The lens barrel is formed by, for example, molding process using plastic material.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The present disclosure is related to arranging at least one wing protruding transversally from a cylindrical lens body of a miniature lens to improve the handling convenience of the miniature lens. In the assembly procedure, the handling apparatus arranges the miniature lens into a lens barrel by pressing on the wing. Furthermore, the lens barrel is selected to be arranged with a reservoir opposite to the wing of the miniature lens. The reservoir is used to contain injected adhesive or glue such that the adhesive or glue is not injected at an edge of the cylindrical lens body. Using the arrangement of the present disclosure, it is able to effectively solve the problems of scratching and polluting an active area of a lens piece.

Figure 1:
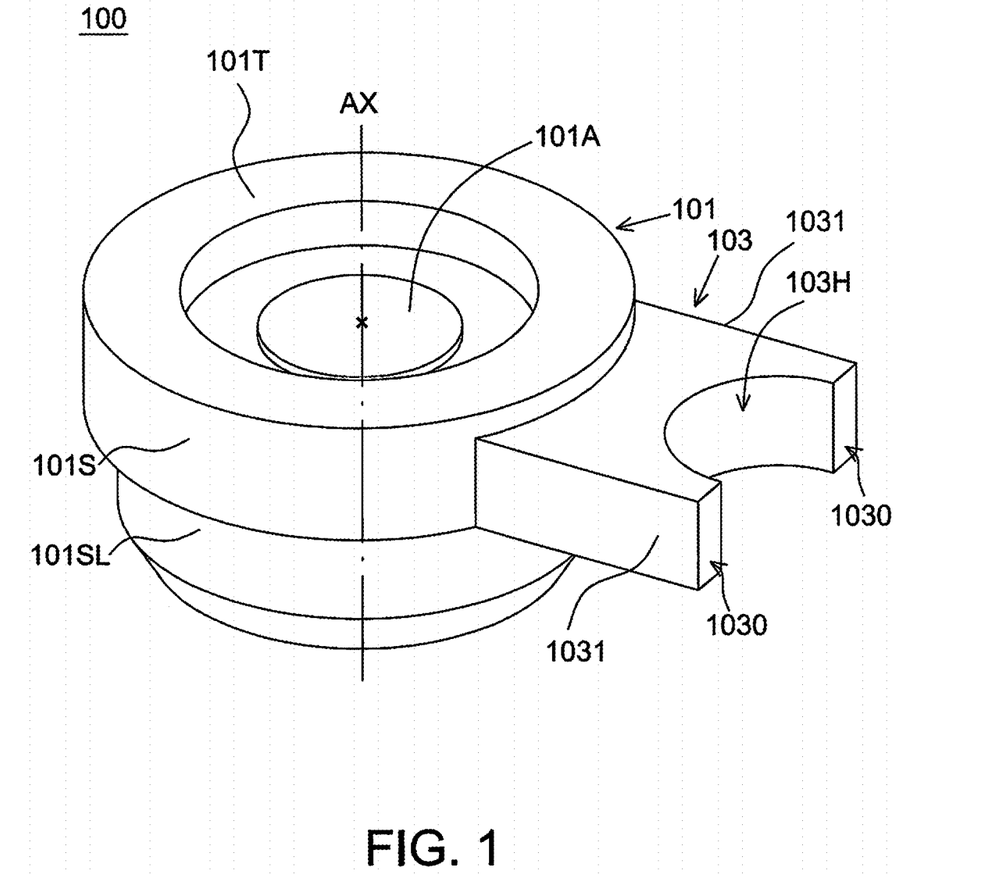
FIG. 1 is a solid diagram of a lens piece according to one embodiment of the present disclosure.

Referring to FIG. 1, it is a solid diagram of a lens piece 100 according to one embodiment of the present disclosure.

The lens piece 100 includes a lens body 101 and a wing 103. The lens body 101 has an optical axis AX and is preferably formed as a cylindrical body having a length extending along the optical axis AX. Light penetrates the lens piece 100 by entering one surface (e.g., an upper surface of FIG. 1) of the lens body 101 and then leaving the other surface (e.g., a lower surface of FIG. 1) of the lens body 101. The lens body 101 has a lens sidewall 101S parallel to the optical axis AX of the lens body 101.

Figure 2:
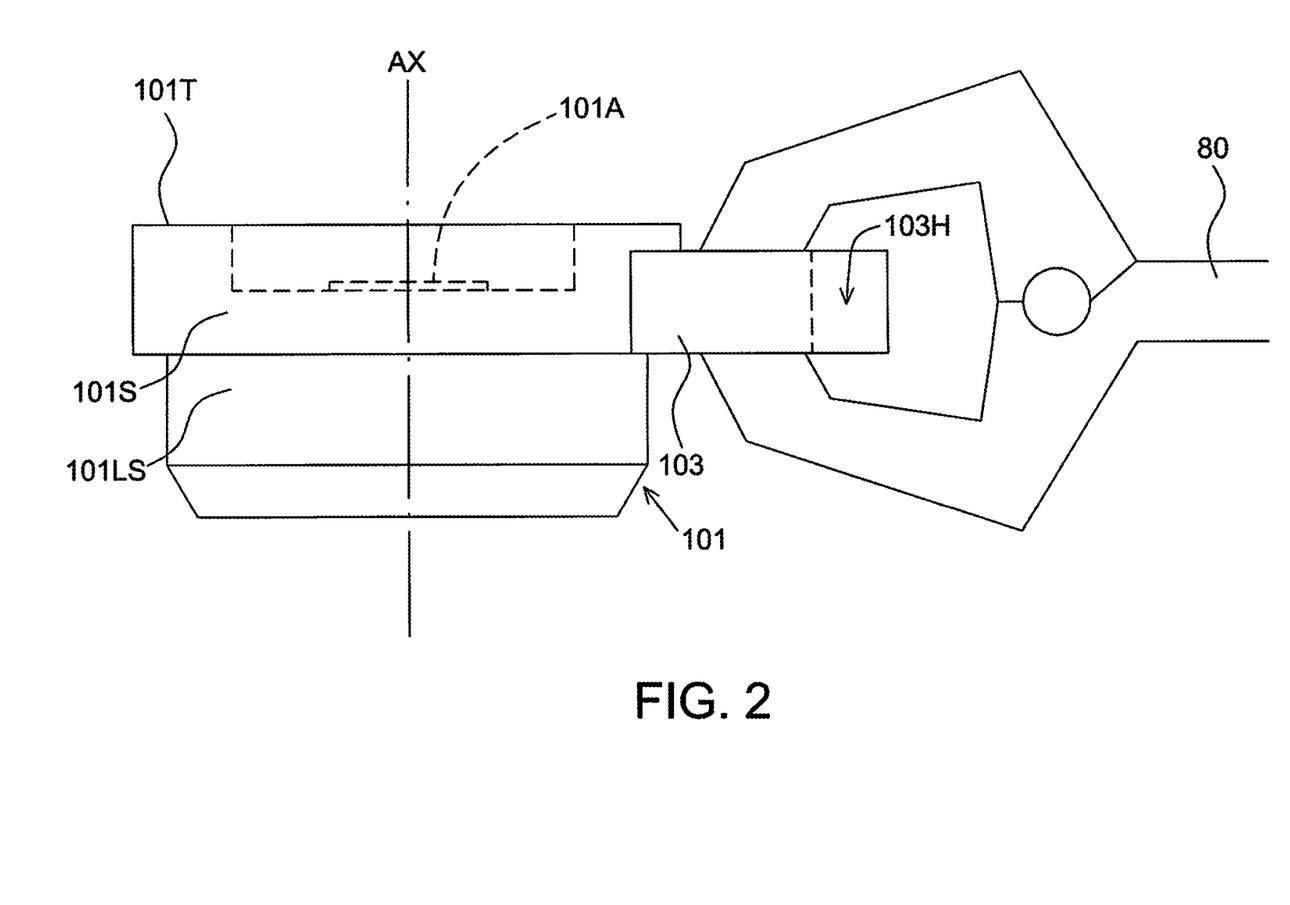
FIG. 2 is a schematic diagram of gripping a lens piece of the present disclosure by using a clamping apparatus.

The wing 103 protrudes transversely from the lens sidewall 101S of the lens body 101. The wing 103 is for being gripped or picked up by a clamping apparatus 80 (e.g., referring to FIG. 2) or other positioning or handling apparatuses in the process of moving, fabricating or disposing the lens piece 100. It is appreciated that the clamping apparatus 80 shown in FIG. 2 is only intended to illustrate that the clamping apparatus 80 does not contact the lens body 101, but the shape, type and clamping method are not limited to those shown in FIG. 2.

According to the arrangement of the clamping apparatus 80 or other positioning or handling apparatuses, the wing 103 is arranged to protrude from the lens sidewall 101S vertically or with a specific tilt angle as long as the wing 103 is held easily. In one aspect, the lens body 101 and the wing 103 are integrally formed by molding process using glass or plastic material.

It should be mentioned that although FIG. 1 shows a single wing 103, the present disclosure is not limited thereto. In other aspects, the lens piece 100 includes more than one wing 103 respectively protrudes from different directions of the lens sidewall 101S. In addition, although FIG. 1 shows that a perimeter of the lens sidewall 101S is larger than a perimeter of a lower sidewall 101SL of the lens body 101 (i.e., the lens body 101 having different diameters at different sections), the present disclosure is not limited thereto. A step formed between the lens sidewall 101S and the lower sidewall 101SL is to allow the lens barrel 304 to support the lens body 101 by attaching the step with an inner flange 304F thereof when the lens piece 100 is put into the lens barrel 304, e.g., referring to FIG. 3.

However, in the case that the lens piece 100 includes more than one wing 103, the wings are laid on an inner platform 304 of the lens barrel 304 (i.e., a number of inner platforms 304P being identical to a number of wings 103) to support the lens piece 100 without arranging sidewalls having different heights on the lens body 101, i.e. 101S and 101SL in FIG. 1 having the same height or same perimeter. In this case, the inner flange 304F of the lens barrel 304 may not be implemented.

Figure 4:
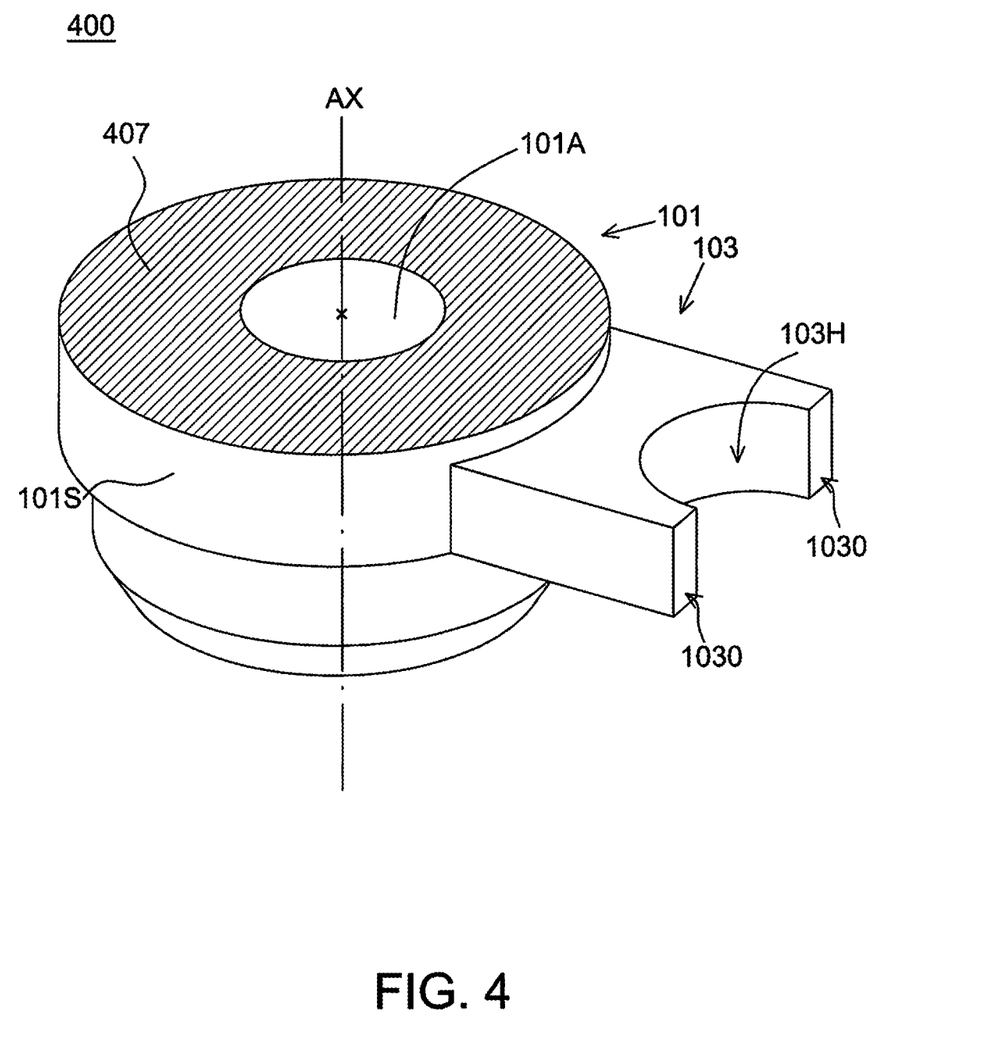
FIG. 4 is a solid diagram of a lens piece according to another embodiment of the present disclosure.

The lens piece 100 further has a lens top surface 101T connecting to the lens sidewall 101S. The lens top surface 101T includes an active area 101A for light to pass through the lens body 101. It should be mentioned that although FIG. 1 shows that a light incident plane of the active area 101A is lower than a height of the lens top surface 101T, the present disclosure is not limited thereto. In other aspects, the light incident plane of the active area 101A has a height substantially identical to the height of the lens top surface 101T as shown in FIG. 4. In other words, in the present disclosure, the light incident plane of the active 101A has the same height or is lower than the lens top surface 101T. FIG. 4 is a solid diagram of a lens piece 400 according to another embodiment of the present disclosure in which elements identical to FIG. 1 are indicated by identical reference numerals.

In some aspects, to allow the light penetrates the lens piece 100 only through the active area 101A, a lens mask 407 is further formed to cover a region of the lens top surface 101T outside the active area 101A, as shown by the region filled with slant lines in FIG. 4. The lens mask 407 is formed by coating or sputtering opaque material on the lens top surface 101T to prevent the light from entering the lens body 101 via the region outside the active area 101A. In some aspects, the lens mask 407 is further formed on an upper surface of the wing 103.

Figure 3:
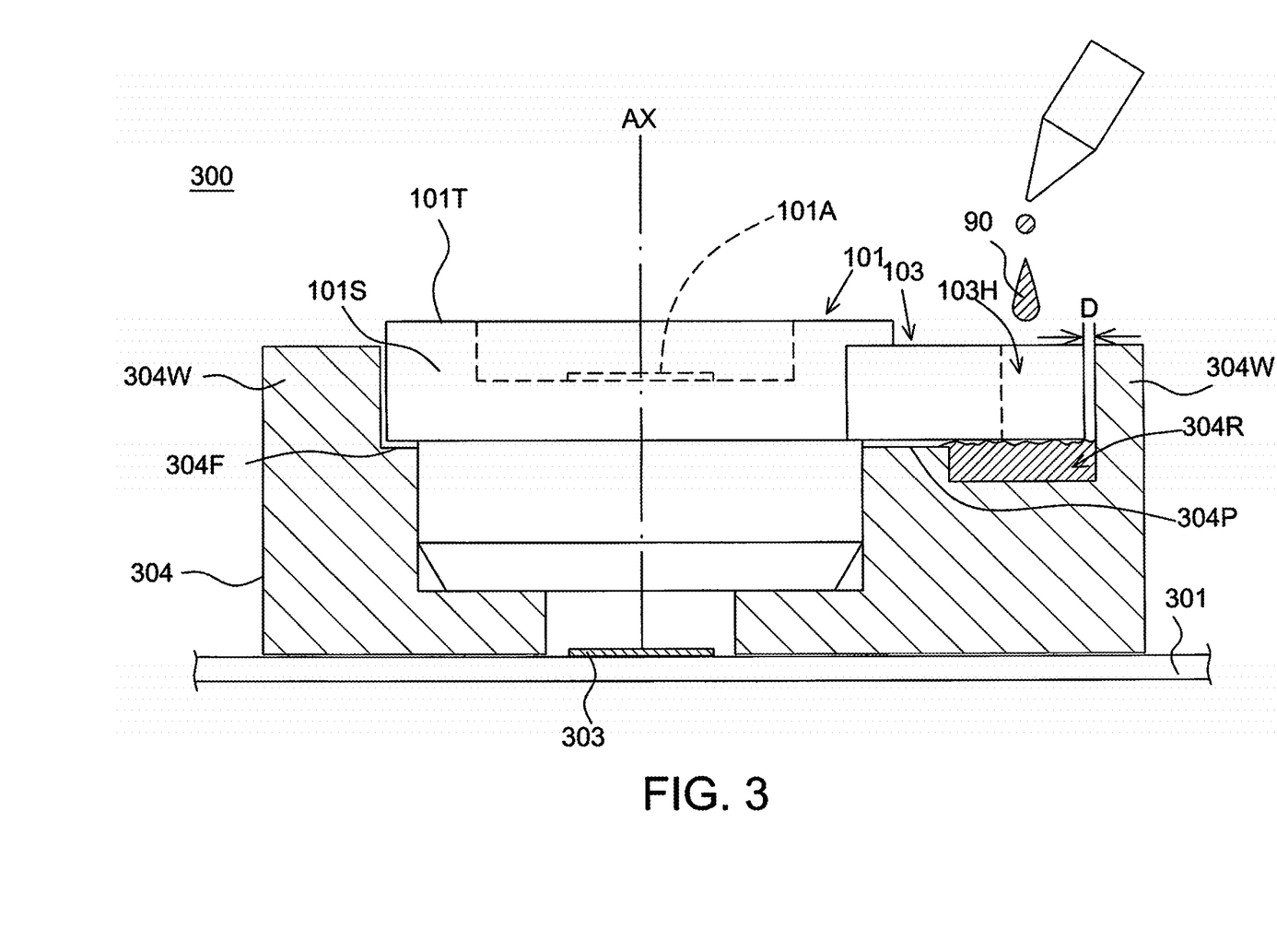
FIG. 3 is a cross sectional view of an imaging device according to one embodiment of the present disclosure.

In one non-limiting aspect, the wing 103 includes a breach 103H parallel to the optical axis AX for injecting adhesive 90 into the lens barrel 304 therethrough, e.g., referring to FIG. 3. Although FIGS. 1 and 3 show that the breach 103H has a semicircle shape, it is only intended to illustrate but not to limit the present disclosure. In other aspects, the breach 103H has a rectangular shape, a triangle shape or other irregular shapes without particular limitations as long as the adhesive 90 can flow through. In addition, although FIGS. 1 and 3 show that the breach 103H is located at a front end 1030 of the wing 103, the present disclosure is not limited thereto. In other aspects, the breach 103H is arranged at at least one of two sides 1031 of the wing 103.

Figure 5:
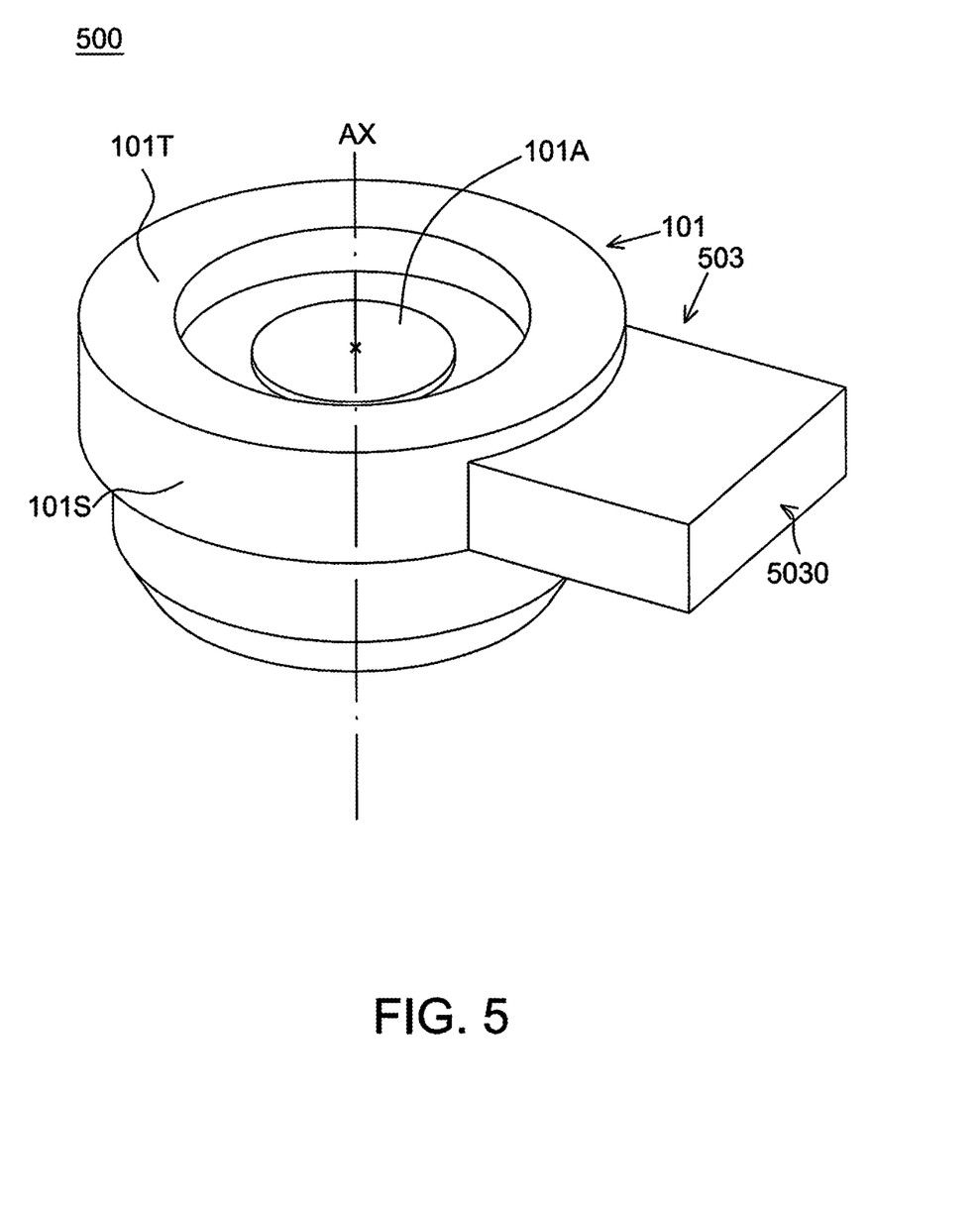
FIG. 5 is a solid diagram of a lens piece according to an alternative embodiment of the present disclosure.

In another non-limiting aspect, the front end 1030 of the wing 103 does not have any breach, e.g., referring to FIG. 5. FIG. 5 is a solid diagram of a lens piece 500 according to an alternative embodiment of the present disclosure in which elements identical to FIG. 1 are indicated by identical reference numerals.

Figure 6:
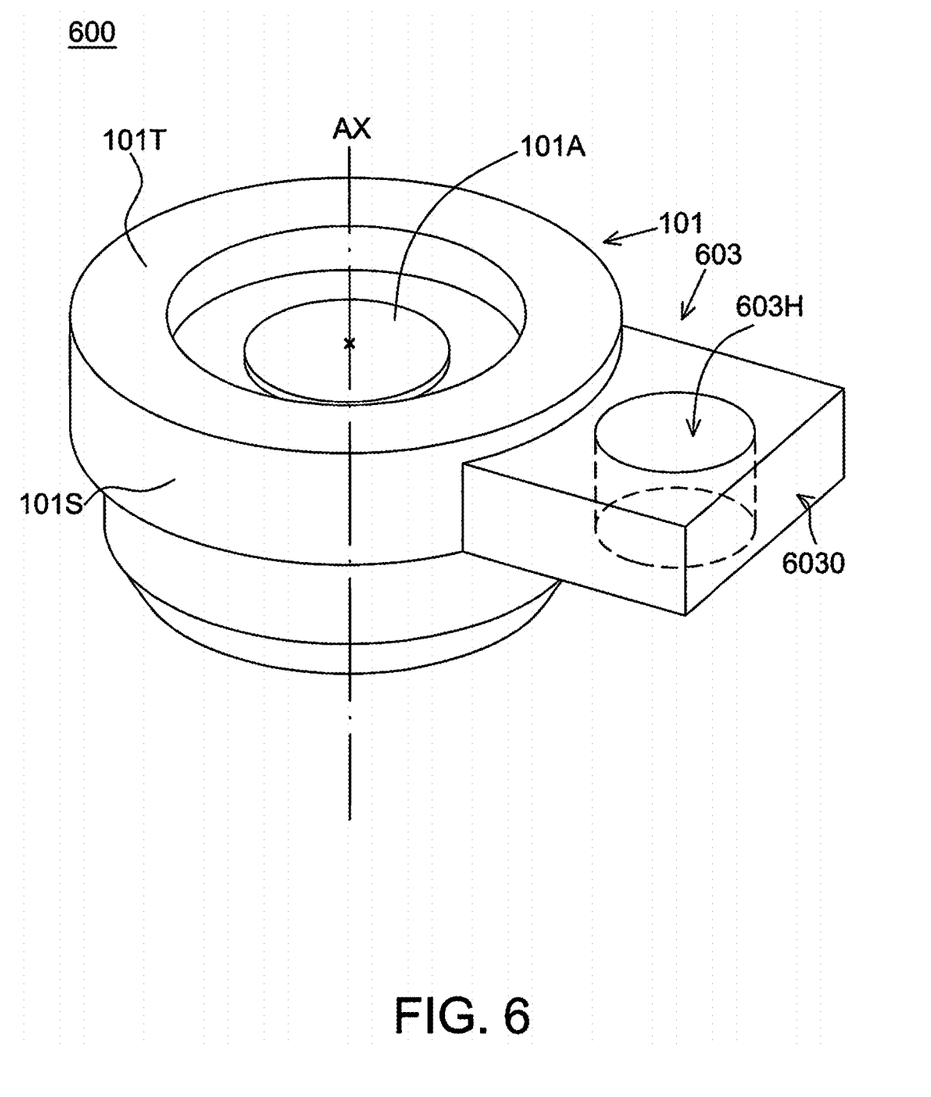
FIG. 6 is a solid diagram of a lens piece according to an alternative embodiment of the present disclosure.

In another non-limiting aspect, the wing 103 includes at least one through hole 603H parallel to the optical axis AX for injecting adhesive 90 into the lens barrel 304 therethrough, e.g., referring to FIG. 6. It should be mentioned that although FIG. 6 shows a single through hole 603H, it is only intended to illustrate but not to limit the present disclosure. It is possible to arrange multiple through holes parallel to the optical axis AX on the wing 103. In other aspects, the through hole 603H has a rectangle shape, a triangle shape or other irregular shapes without particular limitations as long as the adhesive 90 can flow through. FIG. 6 is a solid diagram of a lens piece 600 according to an alternative embodiment of the present disclosure in which elements identical to FIG. 1 are indicated by identical reference numerals.

In addition, the implementation of the wing 103 is determined according to the structure of the lens barrel 304.

Referring to FIG. 3 again, it is a cross sectional view of an imaging device 300 according to one embodiment of the present disclosure. The imaging device 300 includes a lens assembly, a substrate 301 and a sensor 303. The lens assembly includes the lens piece 100 or 400 to 600 in FIGS. 1 and 4-6 as well as a lens barrel 304. The lens barrel 304 is arranged on the substrate 301 for carrying the lens piece 100, and has an accommodation space for accommodating the sensor 303 therein. As shown in FIG. 3, the accommodation space is a lower part of a hollow space of the lens barrel 304, and an upper part of the hollow space is used to accommodate the lens piece. For example, the lens barrel 304 is attached to the substrate 301 via soldering, conductive adhesive or ultrasound joint without particular limitations.

The substrate 301 is, for example, a printed circuit board (PCB), a flexible circuit board (FCB) or the like. In addition for arranging the sensor 303 and the lens assembly thereon, other components, e.g., resistors, capacitors or the like, are also arranged on the substrate 301.

The sensor 303 is a semiconductor imaging device, e.g., the CMOS image sensor or single photon avalanche diode (SPAD) array. The sensor 303 is used to detect light penetrating the active area 101A of the lens piece 100 to output detected signals to the substrate 301, and the detected signals are transferred to an external device via the substrate 301. The method of arranging the sensor 303 on the substrate 301 is known to the art and not a main objective of the present disclosure, and thus details thereof are not described herein.

As mentioned above, the lens barrel 304 includes an inner flange 304F (e.g., formed surrounding an inner side of the lens barrel 304 but not overlapping with the inner platform 304P) used to attach to the step between the lens sidewall 101S and the lower sidewall 101SL for supporting the lens piece 100 in the lens barrel 304. The lens barrel 304 further includes an inner platform 304P used to carry at a bottom surface of the wing 103. In addition, the lens barrel 304 further includes a reservoir 304R corresponding to the wing 103 of the lens piece 100. The reservoir 304 is used to contain adhesive 90. As shown in FIG. 3, the reservoir 304R is arranged between the inner platform 304P and a ring wall 304W of the lens barrel 304 surrounding the outside of the lens sidewall 101S and the wing 103. According to different aspects, the front end 1030 of the wing 103 is attached to an inner surface of the ring wall 304W or has a predetermined distance from the inner surface of the ring wall 304W.

For example, in the aspects of FIGS. 1 and 4, as the wing 103 has a breach 103H opposite to the reservoir 304R, the front end 1030 of the wing 103 is directly attached (but not limited) to the inner surface of the ring wall 304W. The adhesive 90 is injected into the reservoir 304R via the breach 103H. It is appreciated that the type of an apparatus for injecting the adhesive 90 is not particularly limited.

For example, in the case that the breach is arranged at the side 1031 of the wing 103, the front end 1030 of the wing 103 preferably has a predetermined distance D (e.g., referring to FIG. 3) from the inner surface of the ring wall 304W such that the adhesive 90 is injected into the reservoir 304R via the space between the predetermined distance D. In addition, for facilitating the injection of the adhesive 90, the corresponding edge of the front end 1030 of the wing 103 and/or the ring wall 304W is formed with a groove having a tilt angle but are not formed as a vertical angle as shown in FIG. 3.

For example in the aspect shown in FIG. 5, the front end 5030 of the wing 503 preferably has a predetermined distance D (e.g., referring to FIG. 3) from the inner surface of the ring wall 304W to facilitate the injection of the adhesive 90 into the reservoir 304R via the space between the predetermined distance D. Besides, for facilitating the injection of the adhesive 90, the corresponding edge of the front end 5030 of the wing 503 and/or the ring wall 304W is formed with a groove having a tilt angle but are not formed as a vertical angle as shown in FIG. 3.

For example in the aspect shown in FIG. 6, as the wing 603 has at least one through hole 603H opposite to the reservoir 304R, the front end 6030 of the wing 603 is directly attached (but not limited) to the inner surface of the ring wall 304W. The adhesive 90 is injected into the reservoir 304R via the through hole 603H.

In other aspects, the wing is formed with both the breach and the through hole for facilitating the injection of the adhesive 90.

The lens piece 101 and the lens barrel 304 are generally manufactured separately. In the assembly procedure for disposing the lens piece 100 into the lens barrel 304, the clamping apparatus 80 or other positioning or handling apparatuses can press on the swing 103 to push the lens piece 100 into the lens barrel 304. Accordingly, the active area 101A of the lens piece 100 is not contacted by the clamping apparatus 80 to avoid damaging the active area 101A. Meanwhile, the reservoir 304R also has the function of using as a reference point in disposing the lens piece 100.

In the present disclosure, as the adhesive 90 is not injected via the edge of the lens body 101, the adhesive 90 does not spread to the active area 101A to cause the contamination.

It should be mentioned that although the lens barrel 304 mentioned in the above embodiments all has a reservoir 304R, the present disclosure is not limited thereto. In the aspect that the lens barrel 304 does not have the reservoir 304R (i.e. no concave), the adhesive 90 still can be injected into the inner platform 304P via the breach and/or through hole of the wing 103 to adhere the wing 103 to the inner platform 304P, and the contamination of the active area 101A of the lens body 101 is still avoided.

In some aspects, the imaging device 300 further includes a filter (not shown) between the lens body 101 and the sensor 303, or the filtering material is directly coated on the active area 101A of the lens body 101 or on the sensor 303 to improve the sensing efficiency of the sensor 303.

As mentioned above, in fabricating the conventional cylindrical lens, it is difficult to handle the cylindrical lens and an active area of lens can be scratched or contaminated easily. Accordingly, the present disclosure further provides a cylindrical lens having a transverse swing (e.g. FIGS. 1 and 4-6) and a lens assembly as well as an imaging device including the same (e.g. FIG. 3) to solve various issues existed in fabricating conventional cylindrical lens.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A lens piece, comprising:
 a lens body having a cylindrical shape and comprising a lens sidewall parallel to an optical axis of the lens piece; and
 a wing, transversely protruding from the lens sidewall of the lens body, and comprising a breach parallel to the optical axis, wherein the breach is opened at a front end of the wing.

2. The lens piece as claimed in claim 1, wherein
 the lens body further comprises a lens top surface connecting to the lens sidewall,
 the lens top surface has an active area for light to pass through, and
 a light incident plane of the active area has a same height or is lower than the lens top surface.

3. The lens piece as claimed in claim 2, wherein the lens top surface is covered with a lens mask outside the active area to prevent the light from entering the lens body via a region outside the active area.

4. The lens piece as claimed in claim 1, wherein the lens body and the wing are formed integrally.

5. The lens piece as claimed in claim 1, wherein the breach has a semicircle shape.

6. A lens assembly, comprising:
 a lens piece, comprising:
  a lens body having a cylindrical shape and comprising a lens sidewall parallel to an optical axis of the lens piece; and
  a wing transversely protruding from the lens sidewall of the lens body; and
 a lens barrel, having a platform for carrying the wing of the lens piece and comprising a reservoir corresponding to the wing of the lens piece, wherein the reservoir is adjacent to the platform of the lens barrel and a bottom surface of the reservoir is lower than the platform for containing adhesive upon the bottom surface.

7. The lens assembly as claimed in claim 6, wherein the lens barrel further comprises a ring wall encompassing the lens sidewall, and
a front end of the wing is attached to the ring wall or has a predetermined distance from the ring wall.

8. The lens assembly as claimed in claim 6, wherein the wing comprises a breach parallel to the optical axis, and
the reservoir of the lens barrel is opposite to the breach.

9. The lens assembly as claimed in claim 6, wherein the wing comprises at least one through hole parallel to the optical axis, and
the reservoir of the lens barrel is opposite to the at least one through hole.

10. The lens assembly as claimed in claim 6, wherein the lens body further comprises a lens top surface connecting to the lens sidewall,
the lens top surface has an active area for light to pass through, and
a light incident plane of the active area has a same height or is lower than the lens top surface.

11. The lens assembly as claimed in claim 10, wherein the lens top surface is covered with a lens mask outside the active area to prevent the light from entering the lens body from a region outside the active area.

12. The lens assembly as claimed in claim 6, wherein the lens body and the wing are formed integrally and have same material.

13. An imaging device, comprising:
a substrate;
a sensor arranged on the substrate;
a lens piece, comprising:
   a lens body having a cylindrical shape and comprising a lens sidewall parallel to an optical axis of the lens piece; and
   a wing transversely protruding from the lens sidewall of the lens body; and
a lens barrel arranged on the substrate to carry the wing of the lens piece by a platform of the lens barrel, and comprising:
   a reservoir corresponding to the wing of the lens piece, wherein the reservoir is adjacent to the platform of the lens barrel and a bottom surface of the reservoir is lower than the platform for containing adhesive upon the bottom surface; and
   an accommodation space for accommodating the sensor therein.

14. The imaging device as claimed in claim 13, wherein the lens barrel further comprises a ring wall encompassing the lens sidewall, and
a front end of the wing is attached to the ring wall or has a predetermined distance from the ring wall.

15. The imaging device as claimed in claim 13, wherein the wing comprises a breach parallel to the optical axis, and
the reservoir of the lens barrel is opposite to the breach.

16. The imaging device as claimed in claim 13, wherein the wing comprises at least one through hole parallel to the optical axis, and
the reservoir of the lens barrel is opposite to the at least one through hole.

17. The imaging device as claimed in claim 13, wherein the lens body further comprises a lens top surface connecting to the lens sidewall,
the lens top surface has an active area for light to pass through, and
a light incident plane of the active area has a same height or is lower than the lens top surface.

18. The imaging device as claimed in claim 17, wherein the lens top surface is covered with a lens mask outside the active area to prevent the light from entering the lens body from a region outside the active area.

19. The imaging device as claimed in claim 13, wherein the lens body and the wing are formed integrally and have same material.

* * * * *